(12) United States Patent
Bertoni et al.

(10) Patent No.: US 9,909,370 B2
(45) Date of Patent: Mar. 6, 2018

(54) METHOD FOR PRODUCING A TENSILE ARMOR CONFIGURATION OF A FLEXIBLE CONDUIT AND A CONNECTOR FOR A FLEXIBLE CONDUIT

(71) Applicant: Simeros Projetos Eletromecânicos LTDA, Porto Alegre, RS (BR)

(72) Inventors: Fabiano Bertoni, Porto Alegre, RS (BR); Facundo Sebastian Lopez, Porto Alegre, RS (BR)

(73) Assignee: Símeros Projetos Eletromecânicos Ltda, Porto Alegre, RS (BR)

( * ) Notice: Subject to any disclaimer, the term of this patent is extended or adjusted under 35 U.S.C. 154(b) by 0 days.

(21) Appl. No.: 15/176,882

(22) Filed: Jun. 8, 2016

(65) Prior Publication Data
US 2016/0362942 A1   Dec. 15, 2016

(30) Foreign Application Priority Data
Jun. 9, 2015   (BR) .......................... 1020150133715

(51) Int. Cl.
*F16L 33/01* (2006.01)
*F16L 33/18* (2006.01)
(Continued)

(52) U.S. Cl.
CPC .............. *E21B 17/04* (2013.01); *E21B 17/01* (2013.01); *E21B 19/002* (2013.01); *F16L 33/01* (2013.01); *F16L 11/083* (2013.01)

(58) Field of Classification Search
None
See application file for complete search history.

(56) References Cited

U.S. PATENT DOCUMENTS 6,592,153 B1  7/2003  Belcher
8,104,797 B2*  1/2012  Eccleston ............... F16L 33/01
                                                    285/222.1
(Continued)

FOREIGN PATENT DOCUMENTS

EP    2492571 A2    8/2012
EP    3040593 A1    7/2016
(Continued)

OTHER PUBLICATIONS

George Campello et al., "A Novel Concept of Flexible Pipe End Fitting: Tensile Armor Foldless Assembly," Proceedings of the ASME 2012 31st International Conference on Ocean, Offshore and Arctic Engineering, Jul. 2012, Rio de Janeiro, Brazil.
(Continued)

*Primary Examiner* — Matthew R Buck
*Assistant Examiner* — Douglas S Wood
(74) *Attorney, Agent, or Firm* — Hauptman Ham, LLP; Sean A. Passino; Rachel K. Pilloff

(57) ABSTRACT

The present invention discloses a method for obtaining a tensile armor configuration of a flexible conduit comprising the steps of mounting an end ring engaged with the terminal region of each wire of each tensile armor, defining an initial position, which axially displaces the end ring in opposite direction to a free end of the flexible conduit, from the initial position to an end position, so as to cause flexure in the wires of each tensile armor and securing the end ring in end position, to maintain the wires of each tensile armor flexed. The present invention also proposes a connector for a flexible conduit, said connector comprising an end ring engaged with the terminal region of each wire of each tensile armor and fixed in an end position so that the wires of each tensile armor are flexed.

17 Claims, 9 Drawing Sheets

(51) Int. Cl.
*F16L 31/00* (2006.01)
*E21B 17/04* (2006.01)
*E21B 17/01* (2006.01)
*E21B 19/00* (2006.01)
*F16L 11/08* (2006.01)

(56) References Cited

U.S. PATENT DOCUMENTS

| | | | |
|---|---|---|---|
| 9,534,719 B2 * | 1/2017 | Eccleston | F16L 33/01 |
| 2012/0211975 A1 * | 8/2012 | Campello | E21B 17/085 285/222.2 |

FOREIGN PATENT DOCUMENTS

| | | |
|---|---|---|
| FR | 3007494 A1 | 12/2014 |
| WO | 2012/126999 A1 | 9/2012 |
| WO | 2015/027304 A1 | 3/2015 |

OTHER PUBLICATIONS

European Search Report for corresponding European Patent Application No. 16173442.1, dated Oct. 18, 2016.

\* cited by examiner

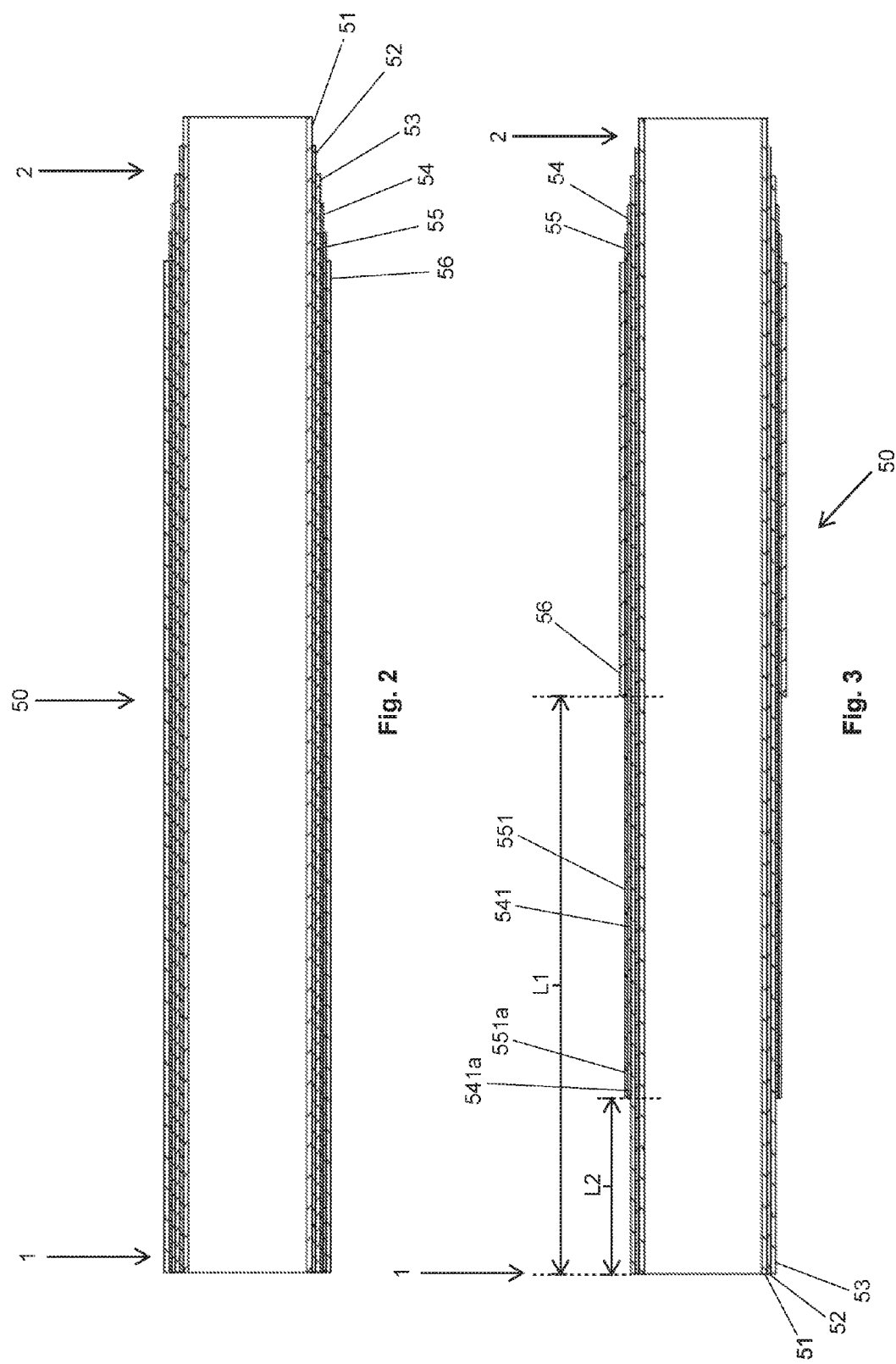

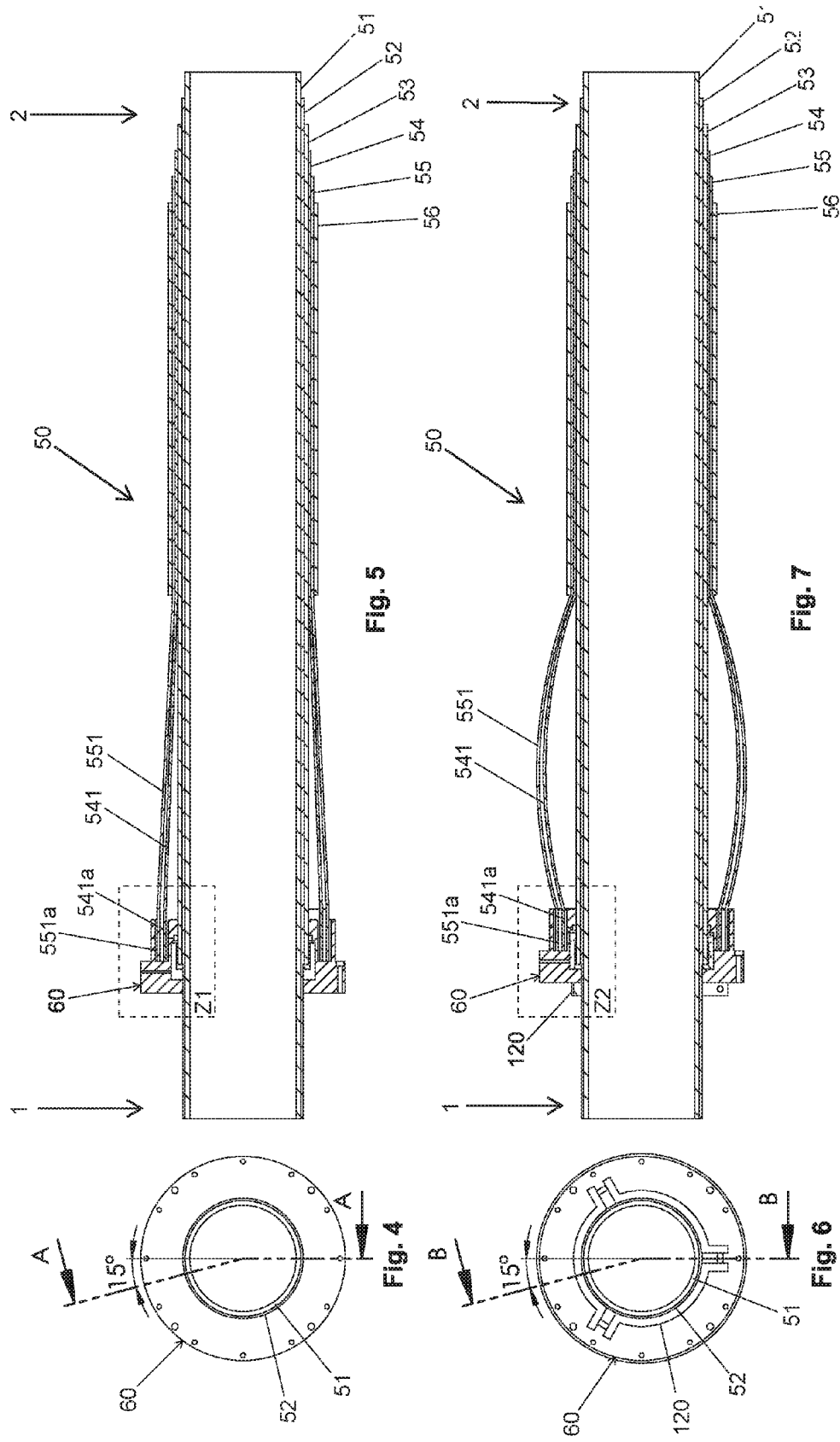

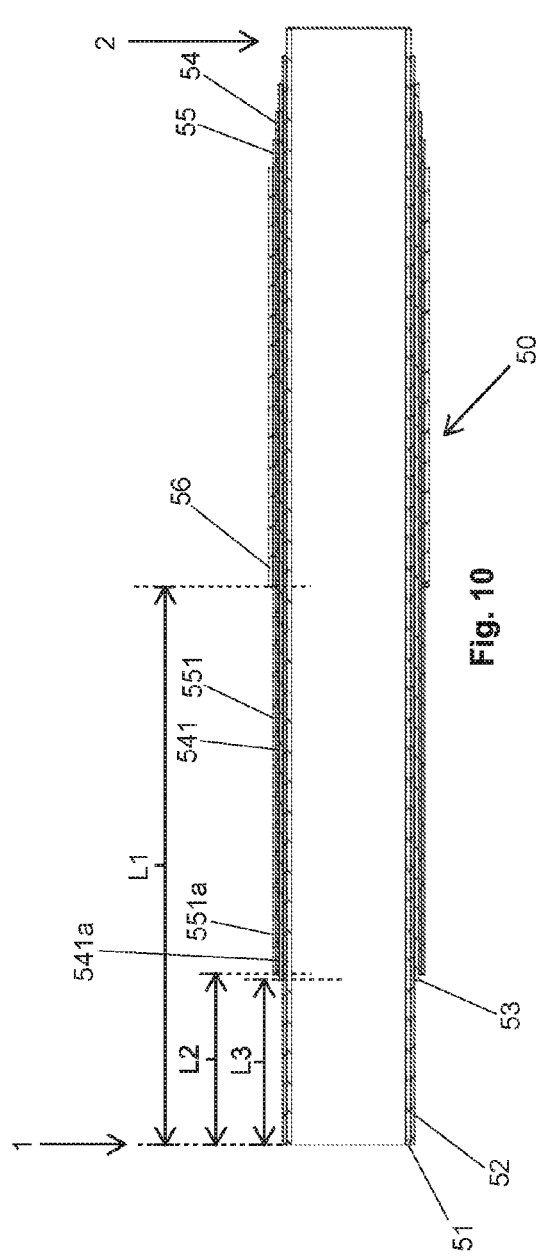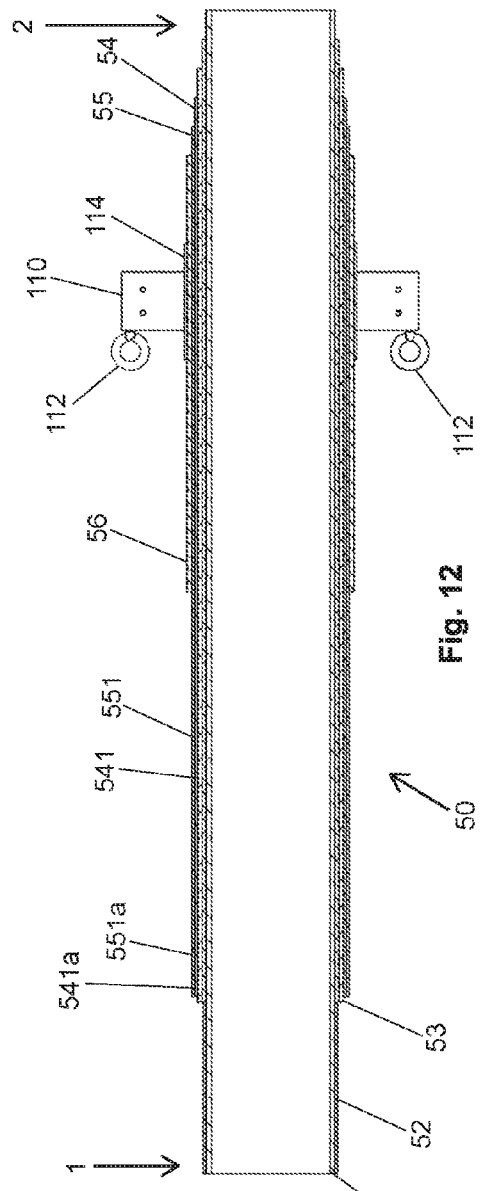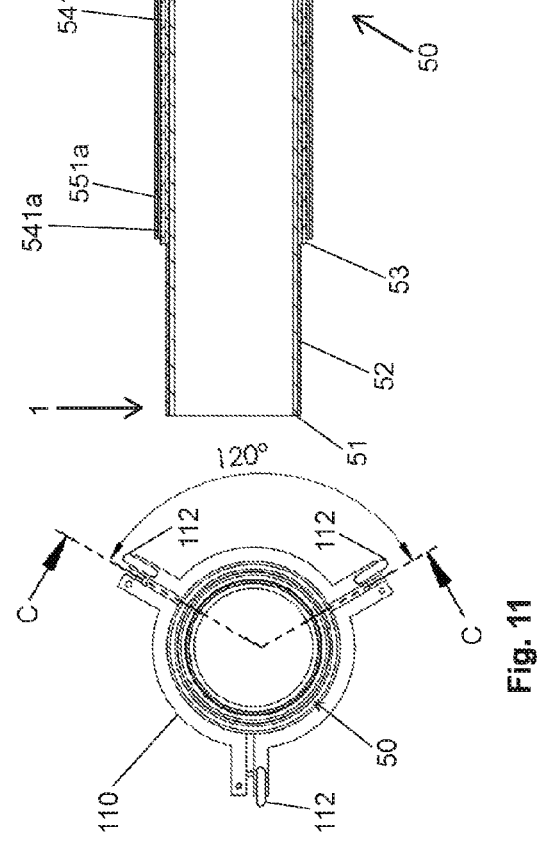

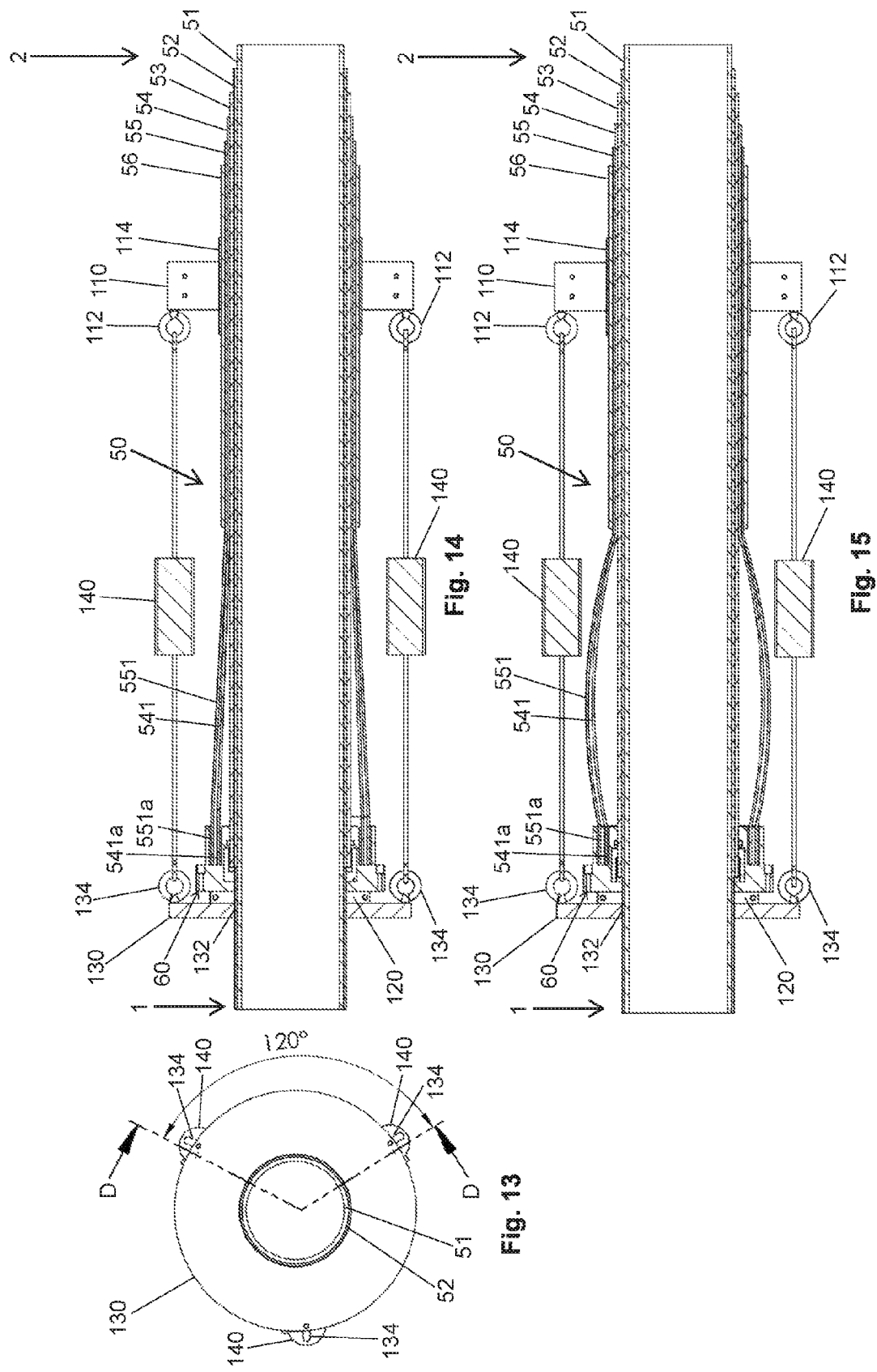

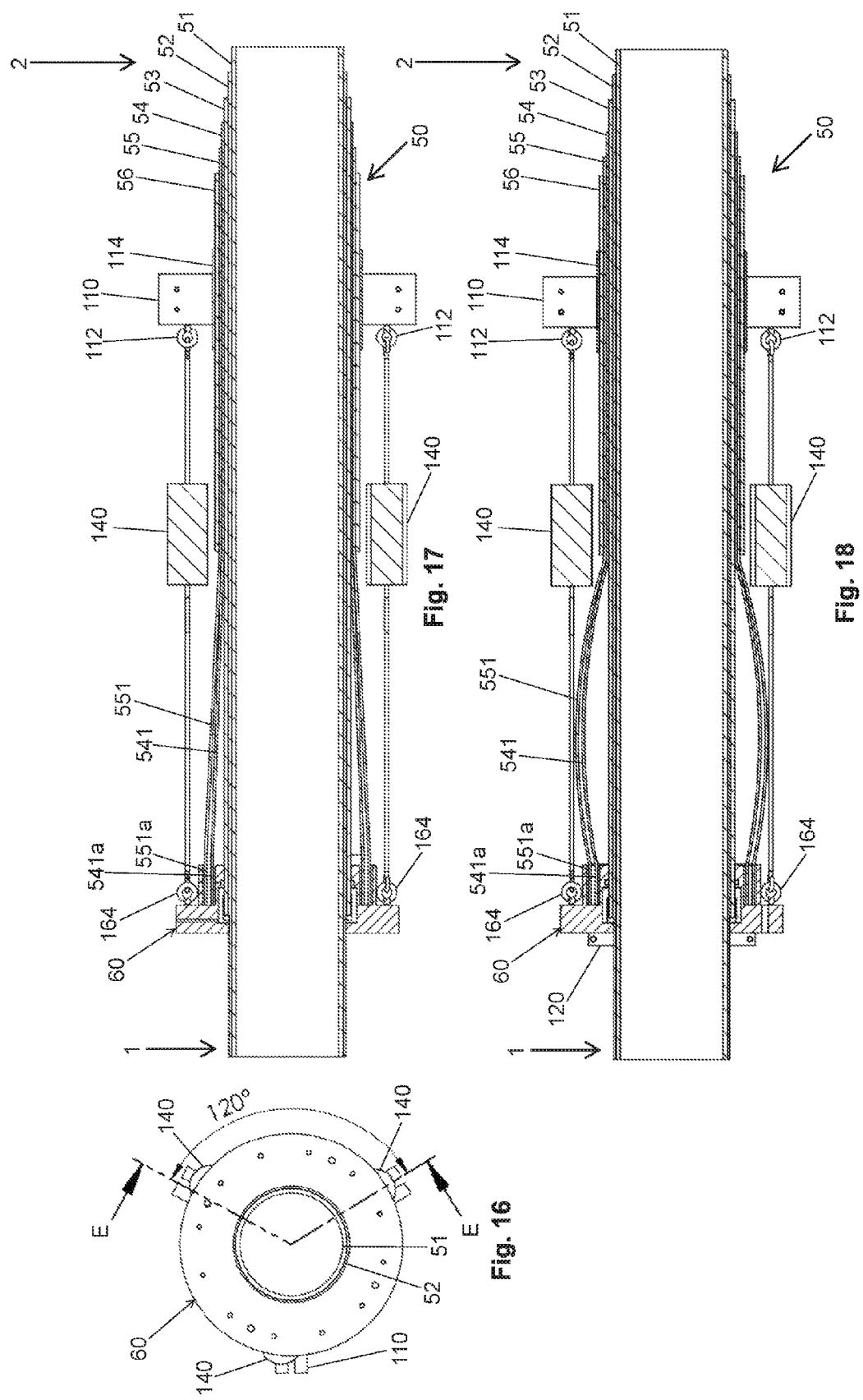

METHOD FOR PRODUCING A TENSILE ARMOR CONFIGURATION OF A FLEXIBLE CONDUIT AND A CONNECTOR FOR A FLEXIBLE CONDUIT

CROSS-REFERENCE TO RELATED APPLICATIONS

This application claims priority benefit to Brazil Application No. 10 2015 013371-5, filed Jun. 9, 2015, which is hereby incorporated herein by reference in its entirety.

FIELD

The present invention refers to a method for producing a tensile armor configuration and a connector for a flexible conduit. Flexible conduit is used in fluids transportation of oil and gas offshore extraction systems. Flexible conduits used for this purpose are made of several layers, of different materials and forms, among which are at least an internal tensile armor and at least an external tensile armor. To connect a flexible conduit to an adjacent element, such as another segment of flexible conduit, to a manifold station or to a platform or ship for oil and gas extraction, a connector, as in English end-fitting for a flexible conduit is installed at the end of a flexible conduit, wherein said connector is responsible for supporting, accommodating and securing all layers of the end of a flexible conduit, maintaining the internal and external tightness of said flexible conduit. In this context, the present invention refers to a method for producing the configuration of a flexible conduit tensile armor and a connector installed on a flexible conduit, so that the obtained tensile armor configuration is anchored near the connector.

BACKGROUND

In the area of offshore oil extraction, collecting oil and gas extracted from wells in the bottom of the sea is made through horizontal conduits, in English flowlines, generally static, and mainly vertical conduits, in English risers, responsible for connection between horizontal conduits and the platform or ship for extracting oil. The vertical conduits can be of rigid or flexible types.

Notably, the flexible conduits (flexible risers) used for this purpose are exposed to different weather conditions arising from the environment in which they are inserted. The strong currents and the seawater itself require that flexible conduits be ready for all the adversities imposed on them.

For this purpose, the state of art foresees flexible conduits made of several layers of materials and in different ways. Among the layers present in the flexible conduit are at least an internal tensile armor and at least an external tensile armor superimposed in relation to said internal tensile armor, wherein each tensile armor is formed by helically winding of a plurality of wires, generally steel. The tensile armors are responsible for the tensile strength of the flexible conduit.

Due to the complexity of manufacturing the flexible conduits and the size of the coiled wire of the tensile armor used in this method, segments of flexible conduits of approximately 1,000 meters long are used over an oil collecting line. Thus, to achieve the required length of the collecting line according to its application, connectors at the ends of each segment of flexible conduit are installed in order to make the connection between the different segments of flexible conduits. Furthermore, the connectors are used to connect the end of a flexible conduit to a manifold station or a platform or a ship for oil extraction.

The connectors are responsible for supporting, accommodating and securing all layers of the flexible conduit, maintaining their internal and external sealing. When installing the connector on the flexible conduit, it is necessary to perform an anchorage of the internal tensile armor and external tensile armor near the connector. To perform this anchorage, one of the options consists in executing one conformation in each extremity of each tensile armor wire producing a terminal region formed into an anchoring profile, for example a corrugated form, as disclosed in U.S. Pat. No. 6,592,153. The shaped terminal regions of each wire are accommodated within the interior of an existing chamber in the connector, wherein said chamber are filled with epoxy resin, thereby making the anchoring of the tensile armor next to the connector.

The terminal region of each wire of each the tensile armor is conformed individually by an operator, with the aid of a shaping device, which requires intensive labor and time for installation of the connector on the flexible conduit. Furthermore, the plastic deformation conferred to the conformed terminal regions in the anchoring profile generates points with high residual stresses, which is characterized as tensile armor fatigue failure factor of the flexible conduits.

Other examples of anchoring of the tensile armor are described in the International application WO2012126999. Particularly, in one of the disclosed examples, in addition to the terminal region conformed in an anchoring profile, each tensile armor comprises a bi-conical shaped portion, which moves away radially from the longitudinal axis of the flexible conduit, from the entry point said tensile armor in the chamber, and then draws near radially the longitudinal axis of the flexible conduit, as said tensile armor approaches the connecting flange of the connector. This particular bi-conical shaped configuration of the tensile armor improves the anchoring performance of the tensile armor next to the connector.

To obtain this particular configuration of tensile armors, International application WO2012126999 teaches that first, each tensile armor wire must be moved outward radially from each wire of each tensile armor, then to introduce, under the outwardly moved parts of the internal tensile armor, a shaping ring having a bi-conical shaped external profile. Afterwards, each wire of tensile armor is moved over the shaping ring creating the bi-conical shape in the tensile armor. It should be noticed that in this step it happens a plastic deformation in each wire of tensile armor. Subsequently, it is performed a conformation in the terminal region of each tensile armor wire, thus producing a terminal region conformed into an anchoring profile. To remove the shaping ring, the ends of the tensile armor are lifted and then said ends are allowed to return to their initial position.

In practice, the method of producing the configuration of a tensile armor in a bi-conical shape, as taught in International application WO2012126999, increases even more the amount of labor and time necessaries for the installation of the connector on the flexible conduit, besides the fact that the plastic deformation attributed to the bi-conical shaped portion of tensile generates points with high residual stresses, which are characterized as a fatigue failure factor of the flexible conduit tensile armor.

SUMMARY

With the object of eliminating these inconveniences, the present invention proposes a method for producing a tensile armor configuration of a flexible conduit comprising the steps of mounting an end ring engaged with the terminal region of each tensile armor wire, defining an initial position, axially dislocating the end ring in the opposite direction of a free end of the flexible conduit from the initial position to a end position, so as to cause a bending of each tensile armor wires and fasten the end ring at the end position, in order to keep the wires of each tensile armor flexed.

Advantageously, according to the proposed solution, the flexed configuration of the each tensile armor wires is useful for anchoring the tensile armor next to a connector. Advantageously, all the wires of the internal tensile armor and all the external tensile armor wires flexed at the same time, which denotes a considerable reduction of labor and time for the installation of the connector on the flexible conduit. Also, it is noticed that each tensile armor wires are flexed in an elastic deformation regime, i.e., no plastic deformation, which advantageously promotes a reduction in the level of residual stresses present on the tensile armor wires, contributing for the durability of the assembly to be formed by the connector and the flexible conduit.

The present invention also proposes a connector for a flexible conduit, said connector comprises an end ring engaged to the end region of each tensile armor wire and fasten in an end position, so that the each tensile armor wires are flexed.

BRIEF DESCRIPTION OF THE DRAWINGS

The invention will be fully understood from the following detailed description, which shall be better comprehended in view of the figures, as follows:

FIG. 2 shows a longitudinal sectional view of the flexible conduit in its original manufactured condition.

FIG. 3 shows a longitudinal sectional view of the flexible conduit after the cutting of the external polymeric sealing layer and the tensile armors.

FIG. 4 shows a side view of the end ring engaged in the flexible conduit, in the initial position.

FIG. 5 shows a view according to sectional plan A-A indicated in FIG. 4.

FIG. 6 shows a side view of the end ring engaged on the flexible conduit, in the end position.

FIG. 7 shows a view according to sectional plan B-B indicated in FIG. 6.

FIG. 10 shows a longitudinal sectional view of the flexible conduit after cutting the pressure armor.

FIG. 11 shows a side view of the flexible conduit and a first clamp fastened on the flexible conduit.

FIG. 12 shows a view according to sectional plan C-C indicated in FIG. 11.

FIG. 13 shows a side view of the flexible conduit according to a first embodiment of the step related to the axial displacement of the end ring from the initial position to the end position.

FIG. 14 shows a view according to sectional plan D-D indicated in FIG. 13, with the end ring in the initial position.

FIG. 15 shows a view according to a sectional plan equivalent to the sectional plan D-D indicated in FIG. 13, with the end ring in the end position.

FIG. 16 shows a side view of the flexible conduit according to a second embodiment of the step related to the axial displacement of the end ring from the initial position to the end position.

FIG. 17 shows a view according to the sectional plan E-E indicated in FIG. 16, with the end ring in the initial position.

FIG. 18 shows a view according to a sectional plan equivalent to the sectional plan E-E indicated in FIG. 16, with the end ring in the end position.

DETAILED DESCRIPTION

The following detailed description is based on a flexible conduit (50) comprising six layers, as provided in the state of the art. However, it will become apparent that the invention herein proposed does not configure only to a flexible conduit (50) having six layers, but can be applied to other flexible conduits having different numbers of layers, complying with the scope of the claims.

Figure 1:
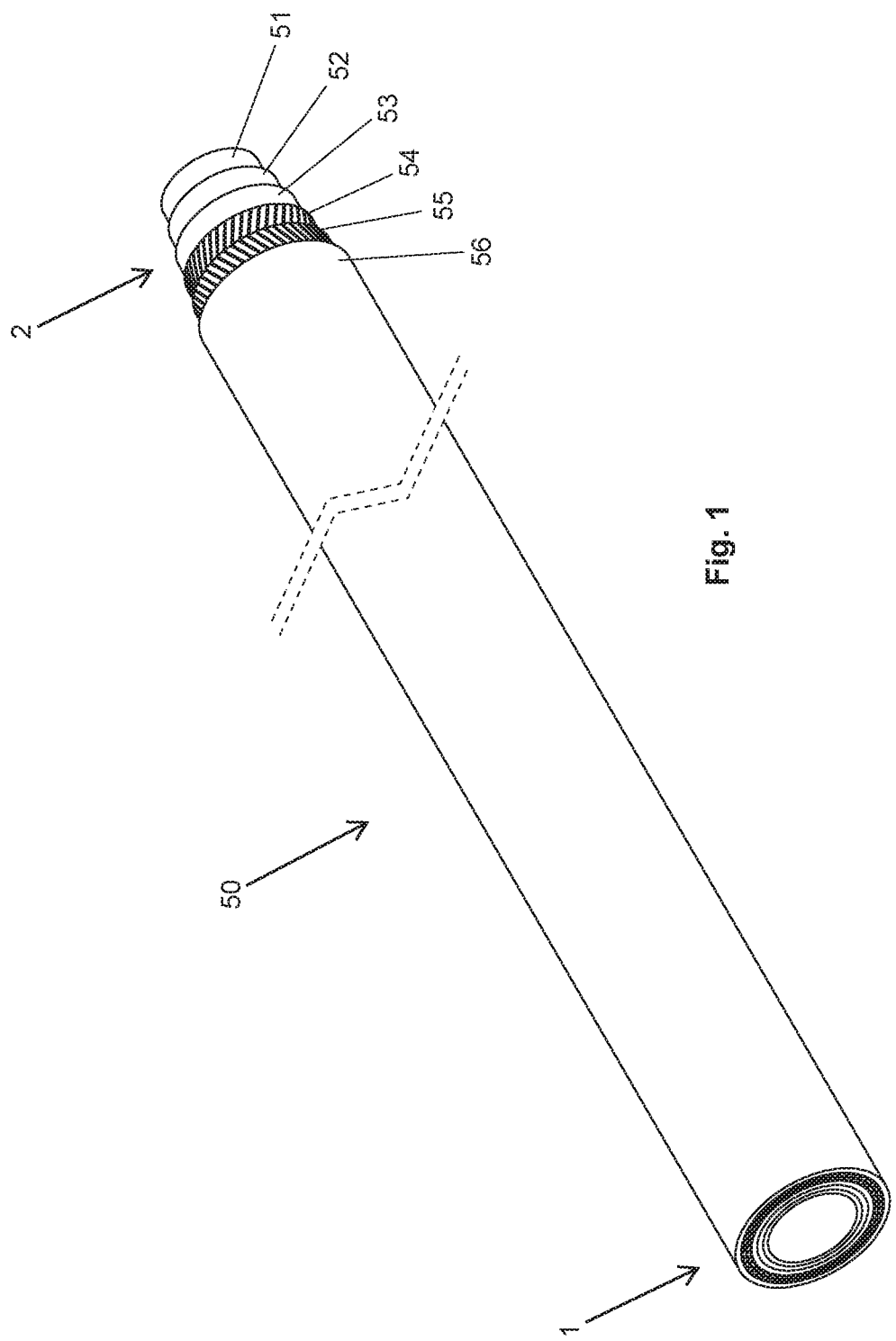
FIG. 1 shows a perspective view of a flexible conduit in its original manufactured condition.

A flexible conduit (50) having six superposed layers, as shown in FIGS. 1, 2 and 3 is comprised of an internal housing (51), an internal polymeric sealing layer (52), a pressure armor (53), an internal tensile armor (54), an external tensile armor (55) and a external polymeric sealing layer (56). The internal tensile armor (54) is formed by long-pitch helically winding of a plurality of wires (541) and the external tensile armor (55) is formed by long-pitch helical windings of a plurality of wires (551). The pressure armor (53) is formed by short-pitch helical windings of a metal wire. FIGS. 1 and 2 shows a piece of the flexible conduit (50) as in original manufacturing condition, with a free end (1) in which a connector (10) can be installed to connect said flexible conduit (50) to an adjacent element, such as another flexible conduit segment to a manifold station or a platform or a ship for oil and gas extraction, said connector (10) responsible for supporting, accommodating and fastening all layers (51, 52, 53, 54, 55, 56) of the free end (1) of the flexible conduit (50), maintaining its internal and external sealing. In FIGS. 1 to 3, 5, 7, 10, 12, 14, 15 and 17 to 19, the other end (2) of the flexible conduit (50) has its layers (51, 52, 53, 54, 55, 56) represented in a staggered way, only as an example, not intended to be limiting in scope.

In this context, the present invention relates to a method for producing a tensile armor configuration (54, 55) of a flexible conduit (50) and a connector (10) installed in a flexible conduit (50), so that the tensile armor configuration (54, 55) obtained is anchored next the connector (10).

The method of producing tensile armor configuration (54, 55) of a flexible conduit (50) comprises the steps of (a) cutting the external layers of the flexible conduit (50) in relation to the external tensile armor (55) in a first length (L1) towards the free end (1) to allow access to said external tensile armor (55), (b) cutting the wires (551) of the external tensile armor (55) and the wires (541) of the internal tensile armor (54) on a second length (L2) in relation to the free end (1), wherein the second length (L2) is smaller than the first length (L1), so to allow access to the pressure armor (53) and to define a terminal region (551a) for each wire (551) of the external tensile armor (55) and a terminal region (541a) for each wire (541) of the internal tensile armor (54). FIG. 3 shows the flexible conduit (50) after cutting the external layers in relation to the external tensile armor (55) in the first length (L1), and after cutting the tensile armor (54, 55) in the second length (L2). It should be noticed that according to the flexible conduit (50) embodiment, the external layers in relation to the external tensile armor (55) correspond to the external polymeric sealing layer (56). Eventually, according to other embodiments of flexible conduits, other layers may be present externally, in relation to the external tensile armor (55).

Figure 8:
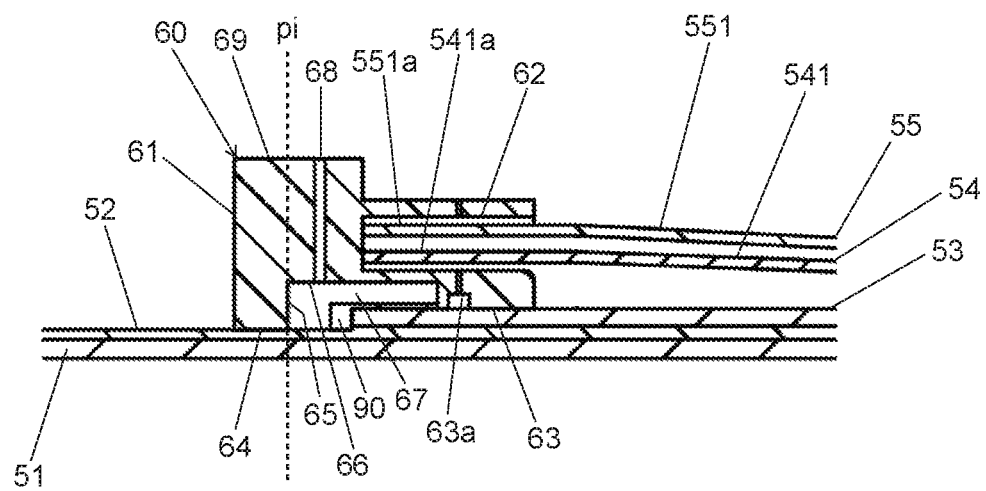
FIG. 8 shows an enlarged view of region "Z1" shown in FIG. 5.
Figure 9:
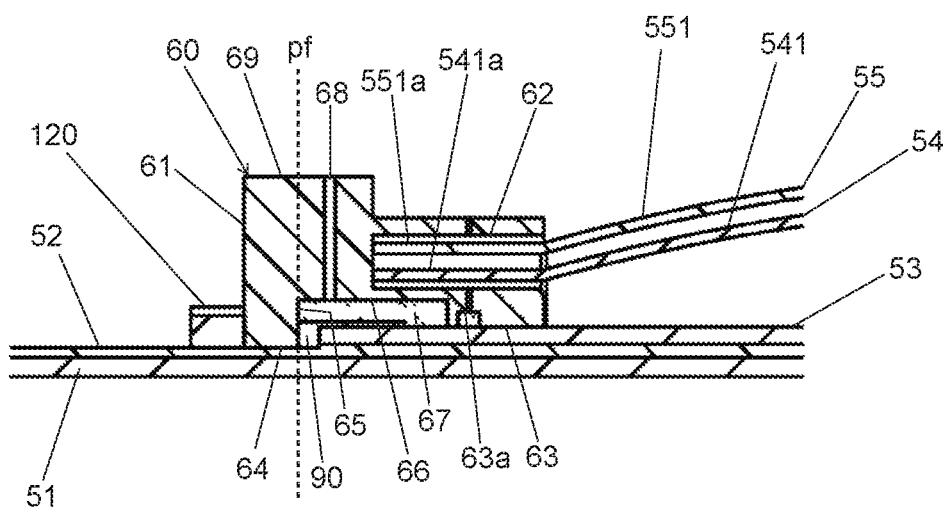
FIG. 9 shows an enlarged view of region "Z2" shown in FIG. 7.

According to the invention, the method further comprises a step (c) of assembling an end ring (60) engaged with the terminal region (541a, 551a) of each wire (541, 551) of each tensile armor (54, 55), defining an initial position (pi), as shown in FIGS. 5 and 8, a step (d) axially displacing the end ring (60) in the opposite direction to the free end (1), from the initial position (pi) to an end position (pf), so as to cause flexure in the wires (541, 551) of each tensile armor (54, 55), and a step (e) fastening the end ring (60) in the end position (pf), in order to maintain the wires (541, 551) of each tensile armor (54, 55) flexed, as shown in FIGS. 7 to 9.

Advantageously, according to the proposed solution, the flexed configuration of the wires (541, 551) of each tensile armor (54, 55) is adequate for anchoring the tensile armor (54, 55) with the connector (10). Advantageously, all the wires (541) of the internal tensile armor (54) and all the wires (551) of the external tensile armor (55) are flexed at the same time, which represents a considerable reduction of labor and time for installation of the connector (10) in the flexible conduit (50). Also, it is noticeable that the wires (541, 551) of each tensile armor (54, 55) are flexed in an elastic deformation regime, i.e., no plastic deformation, which advantageously promotes a reduction in the level of residual stresses present in the wires (541, 551) of tensile armor (54, 55), contributing for greater durability of the assembly formed by the connector (10) and flexible conduit (50).

Preferably, after completion of step (b), step (b1) is performed by cutting the pressure armor (53) in a third length (L3) in relation to the free end (1), wherein the third length (L3) is smaller or equal to the second length (L2), so as to allow access to the internal polymeric sealing layer (52). FIG. 10 shows the flexible conduit (50) after cutting the pressure armor (53), according to an embodiment, wherein the third length (L3) is slightly smaller than the second length (L2).

The cutting of the wires (541, 551) of tensile armor (54, 55) and the cutting of the pressure armor (53) may be carried out with the aid of a cutting tool, such as a manual grinder.

Preferably, after performing step (b1), step (b2) is carried out by positioning a retaining ring (90) over a free end of the pressure armor (53) and over a portion of the internal polymeric sealing layer (52). A retaining ring (90) positioned over the free end of the pressure armor (53) and over a portion of the internal polymeric sealing layer (52) it is better visualized in FIGS. 8 and 9. The retaining ring (90) has the function of maintaining the end of the pressure armor (53) wrapped over the internal polymeric sealing layer (52).

Preferably, the end ring (60) comprises an axial housing (62) in which is engaged the terminal region (541a, 551a) of each wire (541, 551) of each tensile armor (54, 55), as it is better visualized in FIGS. 8 and 9. Preferably, the end ring (60) also comprises a first internal surface (63) sliding on the pressure armor (53) and a second internal surface (64) sliding on the internal polymeric sealing layer (52), the first internal surface (63) and the second internal surface (64) having a difference in diameter which defines a stop wall (65).

According to this embodiment, when carrying out step (d) related with the axial displacement of the end ring (60) from the initial position (pi) to the end position (pf), the first internal surface (63) slides over the pressure armor (53) and the second internal surface (64) slides over the internal polymeric sealing layer (52). After completion of step (b2), it may be required sanding of the exposed portion of the internal polymeric sealing layer (52) in order to facilitate the sliding of the second internal surface (64) on said internal polymeric sealing layer (52). The end position (pf) of the end ring (60) is achieved when the stop wall (65) contacts the retaining ring (90), as it is better visualized in FIG. 9, or it contacts the very end of the pressure armor (53) if the retaining ring (90) is not being used.

Preferably, the end ring (60) comprises a third internal surface (66) located between the first (63) and the second internal surface (64), said third internal surface (66) having a diameter larger than the diameter of the first (63) and the second internal surface (64), defining a cavity (67) between the first (63) and the second internal surface (64), said cavity (67) being connected to at least one channel (68) extended to an external surface (69) of the end ring (60), wherein said cavity (67) is filled with a filler material, as for example, an epoxy resin after completion of step (e). The filling of the cavity (67) with the filler material has the function of keeping the end of the pressure armor (53) wrapped over the internal polymeric sealing layer (52), not only during the method of configuring the tensile armor (54, 55), but also throughout the lifetime of the connector (10) to be anchored next the flexible conduit (50).

The first internal surface (63) may have a circumferential recess (63a) filled with sealing material, such as an expandable foam. In this case, the filling of the circumferential recess (63a) should be performed after carrying out step (e) related to the fastening of the end ring (60) in the end position (pf) and prior to filling the cavity (67) with the filler material, since the circumferential recess (63a) filled with the sealing material has the function of preventing leakage of the filling material out of the cavity (67).

The following describes a first embodiment of step (d) in relation to the axial displacement of the end ring (60) from the initial position (pi) to the end position (pf). In this context, a first clamp (110) is firmly fastened on an external layer (56) of the flexible conduit (50), said first clamp (110) having engagement means (112). In the illustrated embodiment, as shown in FIGS. 11 and 12, the first clamp (110) is a threefold type, wherein each part is fastened on an adjacent part by means of a screw connection, and the engagement means (112) correspond to three eyelets facing the free end (1) and distributed around the first clamp (110). Note that it is possible to use a protective layer (114), for example, a rubber layer between the external surface (56) and an internal surface of the first clamp (110) in order to prevent the first clamp (110) to cause damage to the flexible conduit (50).

A second clamp (120) is slidably supported on the internal polymeric sealing layer (52) and in contact with a frontal surface (61) of the end ring (60). The frontal surface (61) of the end ring (60) is the one facing the free end (1) of the flexible conduit (50). In the illustrated embodiment, as can be seen in FIGS. 6, 14 and 15, the second clamp (120) is a threefold type, wherein each part is fastened to an adjacent portion, by means of a screw connection.

A disc (130) having a bore (132) is slidably supported on the internal polymeric sealing layer (52), wherein said disc (130) is in contact with the second clamp (120) and having engagement means (134). In the illustrated embodiment, it can be seen in FIGS. 13, 14 and 15, that the engagement means (134) correspond to three eyelets facing the other end (2) of the flexible conduit (50) and distributed around the disc (130).

At least one motor means (140) connects the engagement means (112) of the first clamp (110) to the engaging means (134) of the disc (130). In the illustrated embodiment, as shown in FIGS. 13, 14 and 15, there are motor means (140) for each respective pair of coupling means (112, 134). The axial displacement of the end ring (60) is performed by the activation of the motor means (140), which moves the disc (130), the second clamp (120) and said end ring (60) in an opposite direction to the free end (1). FIG. 14 illustrates the end ring (60) in the initial position (pi) prior to the activation of the motor means (140), and FIG. 15 illustrates the end ring (60) in the end position (pf), after the activation of the motor means (140) and therefore with the wires (541, 551) of each tensile armor (54, 55) flexed. The motor means (140) can be a hydraulic or pneumatic drive, for example, a hydraulic or pneumatic cylinder or an electric actuating device such as, for example, an electric hoist with chain or an electric motor that actuates a spindle, among other options.

The step (e) related to the fastening of the end ring (60) in the end position (pf) is performed by firmly fastening the second clamp (120) on the internal polymeric sealing layer (52). Therefore, each screw connection of the second clamp (120) must be firmly tightened. Note that as the wires (541, 551) of each tensile armor (54, 55) are flexed, said wires (541, 551) tend to push the end ring (60) towards the free end (1). Thus, the firm fastening of the second clamp (120) prevents a new displacement of the end ring (60). After the second clamp (120) fastening, it is performed the removal of the motor means (140), the first clamp (110) and the disc (130), obtaining the desired configuration of the tensile armor (54, 55), as shown in FIG. 7.

The following describes a second embodiment of step (d) in relation to the axial displacement of the end ring (60) from the initial position (pi) to the end position (pf). In this context, a first clamp (110) is firmly fastened on an external layer (56) of the flexible conduit (50), said first clamp (110) having engagement means (112). In the illustrated embodiment, the first clamp (110) is identical to the first clamp (110) described in the first embodiment of step (d) and as shown in FIGS. 11 and 12.

Engagement means (164) are provided at the end ring (60). In the illustrated embodiment, as shown in FIGS. 17 and 18, the engagement means (164) corresponds to three eyelets facing the other end (2) of the flexible conduit (50) and distributed around the end ring (60).

At least one motor means (140) connects the engagement means (112) of the first clamp (110) to the engagement means (164) of the end ring (60). In the illustrated embodiment, as shown in FIGS. 16 to 18, there is a motor means (140) for each respective pair of engagement means (112, 164). The axial displacement of the end ring (60) is accomplished by the activation of the motor means (140), which displaces said end ring (60) in an opposite direction to the free end (1). FIG. 17 illustrates the end ring (60) in the initial position (pi) prior to the activation of the motor means (140), and FIG. 18 illustrates the end ring (60) in the end position (pf), after the activation of the motor means (140), and therefore with the wires (541, 551) of each tensile armor (54, 55) flexed. The motor means (140) may be identical to motor means (140) described in the first embodiment of step (d).

The step (e) related to the fastening the end ring (60) in the end position (pf) is performed by firmly fastening the second clamp (120) on the internal polymeric sealing layer (52) and in contact with the frontal surface (61) of the end ring (60), as shown in FIG. 18. The frontal surface (61) of the end ring (60) is the one facing the free end (1) of the flexible conduit (50). In the illustrated embodiment, the second clamp (120) is identical to the second clamp (120) described in the first embodiment of step (d). For the fastening of the second clamp (120), each screw connection of said second clamp (120) must be firmly tightened. After the second clamp (120) fastening, it is performed the removal of the motor means (140), the first clamp (110) and the engagement means (164) present on the end ring (60), obtaining the desired configuration of the tensile armor (54, 55) as shown in FIG. 7.

Alternatively, according to an embodiment not shown, the step (e) related to the fastening of the end ring (60) in the end position (pf) may be performed by a set of axial screws inserted from the frontal surface (61) of the end ring (60), which fasten said end ring (60) on the retaining ring (90). In this case, the retaining ring (90) may have been previously welded to with the pressure of armor (53). Or, alternatively, according to another not shown embodiment, the step (e) related to the fastening of the end ring (60) in the end position (pf) may be performed by a set of radial screws inserted from the external surface (69) of the end ring (60), which fasten said end ring (60) to the pressure armor (53).

The invention also proposes a connector (10) installed in a flexible conduit (50), so that the tensile armor configuration (54, 55) obtained according to the process described above, is anchored near the connector (10).

Figure 19:
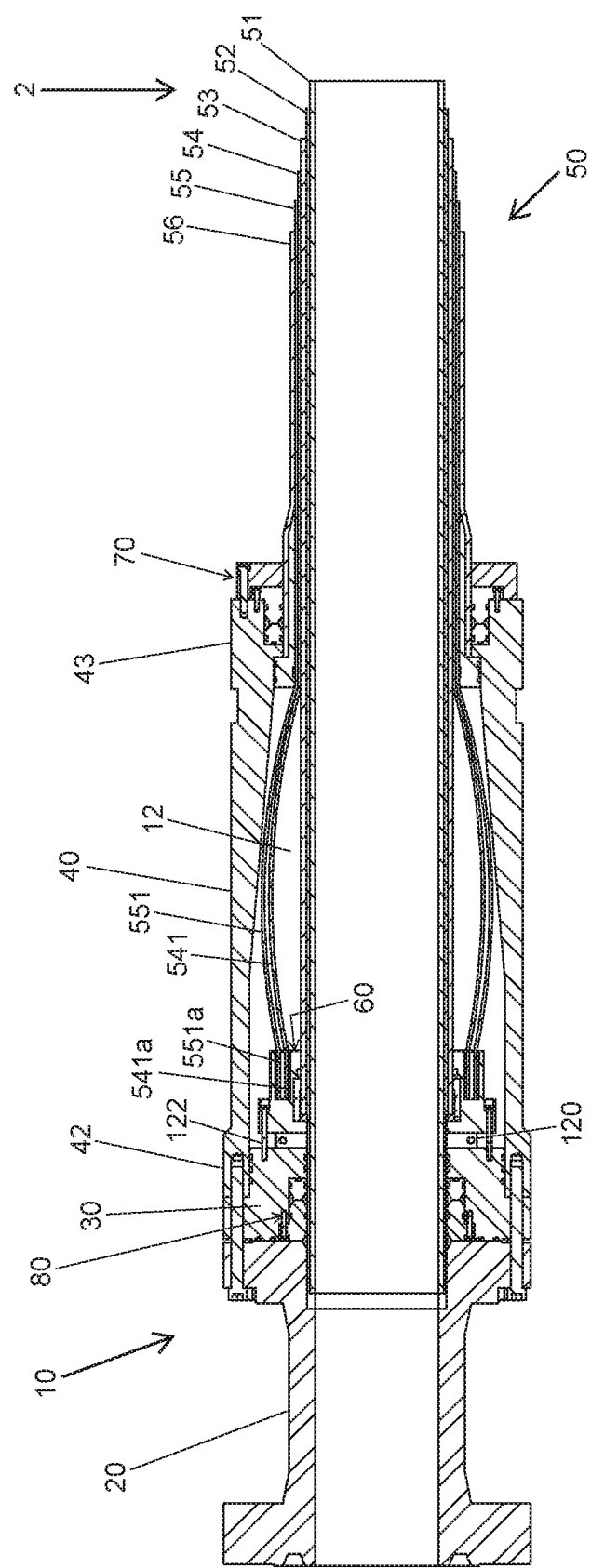
FIG. 19 shows a longitudinal sectional view of a connector installed on a flexible conduit.

As shown in FIG. 19, the connector (10) comprises a connection flange (20) and an external wrap (40) in tubular shape, extending the connection flange (20) and including a set of external seal (70) acting on the external layer (56) of the flexible conduit (50). The connection flange (20) and the external wrap (40) form an annular chamber (12), which extends into a portion of the wires (541, 551) of each tensile armor (54, 55), wherein said annular chamber (12) is filled with a filler material.

According to the invention, the connector (10) comprises an end ring (60) engaged to the extremity (541a, 551a) of each wire (541, 551) of each tensile armor (54, 55) and fixed in an end position (pf), so that the wires (541, 551) of each tensile armor (54, 55) are flexed.

Preferably, the end ring (60) comprises an axial housing (62), which is engaged into the end region (541a, 551a) of each wire (541, 551) of each tensile armor (54, 55), as can be best visualized in FIG. 9. The other characteristics of the end ring (60) may be identical to features already described above.

Figure 20:
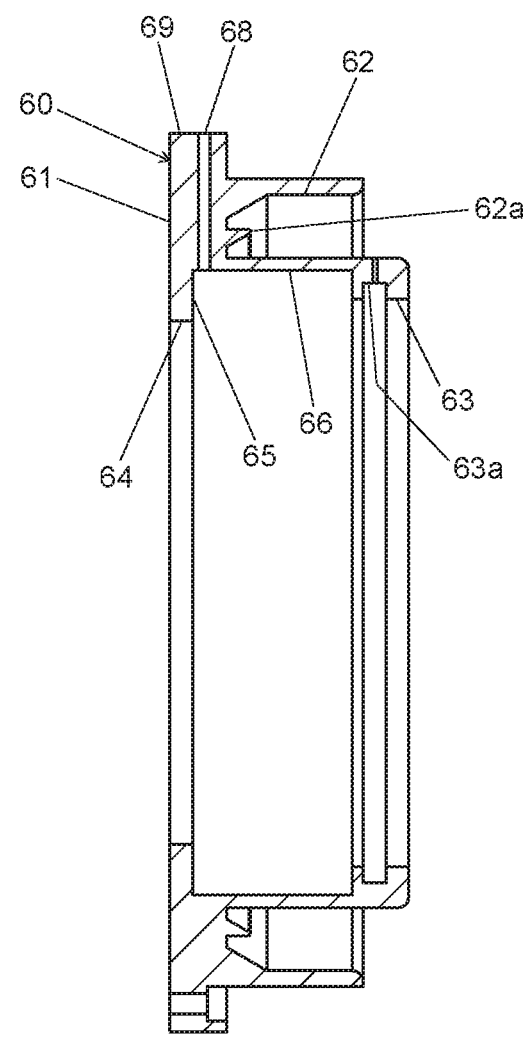
FIG. 20 shows a longitudinal sectional view of an alternative embodiment of the end ring.

Preferably, according to an alternative embodiment of the end ring (60), the axial housing (62) comprises a partition wall (62a) which divides said axial housing (62) in an internal housing and an external housing, as shown in FIG. 20. In this case, the extremity (541a) of each wire (541) of the internal tensile armor (54) is engaged in the internal housing and the extremity (551a) of each wire (551) of the external tensile armor (55) is engaged in the external housing. The partition wall (62a) makes the extremity (541a) of each wire (541) of the internal tensile armor (54) be slightly away from the extremity (551at) of each wire (551) of the external tensile armor (55), what advantageously enables the filler material in the annular chamber (12) to wrap around each extremity (541a, 551a) of each wire (541, 551), increasing the anchoring effect of the tensile armor (54, 55). Anchoring effect is understood as the capacity of the tensile armor (54, 55) to remain anchored near the connector (10), bearing general stresses, such as tensile stresses. The other characteristics of the alternate embodiment of the end ring (60) illustrated in FIG. 20 may be identical to those characteristics already described above.

The fastening of the end ring (60) in the end position (pf) is due to the clamp (120) to be firmly fastened on the internal polymeric sealing layer (52) of the flexible conduit (50) and to be in contact with the frontal surface (61) of the end ring (60), as shown in FIGS. 6 and 7.

The fastening of the end ring (60) in the end position (pf) may be complemented by the fact that said end ring (60) is fastened by screws (122) in the connection flange (20), according to an embodiment not shown, or in a closing flange (30) presented between the connection flange (20) and external wrap (40), as shown in FIG. 20. The closing flange (30) is fastened to a frontal extremity (42) of the external wrap (40) and fastened in the connection flange (20).

The external sealing assembly (70) cooperates with the rear extremity (43) of the external wrap (40) and the external polymeric sealing layer (56) of the flexible pipe (50), so as to seal said flexible conduit (50) from the external environment. The connector (10) further comprises an internal sealing assembly (80) cooperating with the closing flange (30) and the internal polymeric sealing layer (52) of the flexible pipe (50), so as to seal said flexible conduit (50) from the internal environment. The described external sealing assembly (70) and the internal sealing assembly (80) are configured as described in the International application WO2015027304. Alternatively, the external sealing assembly (70) and the internal sealing assembly (80) may have other forms, such as those disclosed in the Brazilian application BRPI1100148-8.

The external wrap (40) is provided with at least two radial openings. After assembling the connector (10) on the flexible conduit (50), a filler material such as, for example, an epoxy resin, is introduced through one of the openings into the annular chamber (12) where the tensile armors (54, 55) are accommodated, and the air is released through the other radial opening, thus carrying out the anchoring of the tensile armor (54, 55) near the connector (10).

The connection flange (20) is responsible for providing the connection of the connector (10) to an adjacent element, such as other flexible conduit segment, a manifold station, or a platform or oil and gas drilling ship.

Eventually, the extremity (541a, 551a) of each wire (541, 551) of each tensile armor (54, 55) can be configured into an anchoring profile, such as, for example, in a corrugated form. In this case, the conformation is performed before the step (c) related to the assembly of the end ring (60) engaged with the extremity (541a, 551a) of each wire (541, 551) of each tensile armor (54, 55). Although the conformation of the extremity (541a, 551a) in an anchoring profile is laborious and creates high residual stress points, said conformation may be desired to increase the anchoring effect of the tensile armor (54, 55) with the connector (10), depending on the stress degree to which the connector (10) and the flexible conduit (50) will be subjected. Note that the portion of the wires (541, 551) in a flexed position will continue benefiting from the advantages derived from the present invention.

The preferred and alternative embodiments herein described do not have the power to limit the invention to the structural shapes described and may have constructive variations that are equivalent without, however, departing from the protective scope of the invention.

The invention claimed is:

1. A method for obtaining a tensile armor configuration of a flexible conduit, said flexible conduit comprising at least an internal tensile armor formed by a plurality of helically winding of wires and at least an external tensile armor formed by a plurality of helically winding wires, the external tensile armor is relatively superimposed to the internal tensile armor, said internal tensile armor is superimposed over a pressure armor, said pressure armor is superimposed in relation to an internal polymeric sealing layer, the flexible conduit further comprising at least one external layer superimposed over the external tensile armor, said flexible conduit having a free end, wherein the method comprises the steps of:
   (a) cutting the at least one external layer of the flexible conduit in relation to the external tensile armor in a first length towards the free end, so as to allow access to said external tensile armor,
   (b) cutting the wires of the external tensile armor and the wires of the internal tensile armor on a second length relative to the free end, wherein the second length is smaller than the first length, so as to allow access to the pressure armor and to define an extremity for each wire of the external tensile armor and an extremity for each wire of the internal tensile armor,
   (c) assembling an end ring engaged with the extremity of each wire of each tensile armor, defining an initial position,
   (d) axially displacing the end ring in the opposite direction of the free end, from the initial position until an end position, so as to cause flexure in the wires of each tensile armor,
   (e) fixing the end ring in the end position, to maintain the wires of each tensile armor flexed.

2. The method according to claim 1, comprising after step "b" a step of:
   cutting the pressure armor in a third length from the free end, the third length being smaller or equal to the second length, to enable access to the internal polymeric sealing layer.

3. The method according to claim 2, comprising afterwards a step of:
   placing a retaining ring on a free end of the pressure armor and over a portion of the internal polymeric sealing layer.

4. The method according to claim 1, wherein the end ring comprises an axial housing into which is engaged the end extremity of each wire of each tensile armor.

5. The method according to claim 2, wherein the end ring comprises a first internal surface sliding on the pressure armor and a second internal surface sliding on the internal polymeric sealing layer, wherein the first internal surface and the second internal surface have a difference in diameter defining a stop wall.

6. The method according to claim 5, wherein the end ring comprises a third internal surface located between the first and the second internal surface, said third internal surface having a diameter greater than the diameter of the first and the second internal surface thus defining a cavity between the first and the second internal surface, wherein said cavity is connected to at least one channel, which extends to an external surface of the end ring and said cavity is filled with a filler material after completion of the step "e".

7. The method according to claim 1, wherein the step "d" is performed with the aid of:
   a first clamp firmly fixed on an external layer of the flexible conduit, said first clamp having engagement means, a second clamp slidably supported on the internal polymeric sealing layer and in contact with a frontal surface of the end ring;

a disc having a bore slidably supported on the internal polymeric sealing layer, said disc being in contact with the second clamp and having engagement means, at least one motor means connecting the engagement means of the first clamp to the engagement means of the disc wherein the axial displacement of the end ring is performed by the activation of the motor means which displace the disc, the second clamp and said end ring in an opposite direction to the free end.

8. The method according to claim 7, wherein the step "e" is performed by firmly fastening the second clamp on the internal polymeric sealing layer.

9. The method according to claim 8, comprising a step of removing the motor means, the first clamp and the disc.

10. The method according to claim 1, wherein step "d" is performed with the aid of:

a first clamp firmly fastened on an external layer of the flexible conduit, said first clamp having engagement means, engagement means provided in the end ring;

at least one motor means connecting the engagement means of the first clamp to the engaging means of the end ring;

wherein an axial displacement of the end ring is accomplished by activation of the motor means which displaces said end ring in an opposite direction to the free end.

11. The method according to claim 10, wherein the step "e" is performed by the firmly fastening of a second clamp on the internal polymeric sealing layer and in contact with a frontal surface of the end ring.

12. The method according to claim 11, comprising a step of removing the motor means, the first clamp and the engagement means present on the end ring.

13. A connector for flexible conduit wherein a tensile armor configuration is obtained by the method according to claim 1.

14. A connector for flexible conduit, said flexible conduit comprising at least an internal tensile armor formed by a plurality of helically winding wires, each wire with a extremity, and at least one external tensile armor formed by a plurality of helically winding wires, each wire having an extremity, the external tensile armor being superimposed in relation to the internal tensile armor, and said connector comprising a connection flange and an external wrap of tubular shape, extending connection flange and including a set of external seal acting on an external layer of the flexible conduit, said connection flange and said external wrap forming an annular chamber, which extends a portion of the wire of each tensile armor, said annular chamber being filled with a filler material, wherein the connector comprises an end ring placed within the annular chamber, said end ring engaged with the extremity of each wire of each tensile armor and fixed in an end position, so that the wires of each tensile armor are flexed, and wherein the fastening of the end ring in the end position occurs due to a clamp being firmly fastened on an internal polymeric sealing layer of the flexible conduit and being in contact with a frontal surface of the end ring.

15. The connector for flexible conduit according to claim 14, wherein the end ring comprises an axial housing into which is engaged the extremity of each wire of each tensile armor.

16. The connector for flexible conduit according to claim 15, wherein the axial housing comprises a partition wall which divides said axial housing in an internal housing and an external housing, wherein the extremity of each wire of the internal tensile armor is engaged in the internal housing and the extremity of each wire of the internal tensile armor which engages in the external housing.

17. The connector for flexible conduit according to claim 14, wherein the fastening of the end ring in the end position is complemented by the fact that said end ring is fastened by means of screws on the connection flange or by a closing flange present between the connection flange and the external wrap.

* * * * *